US010288061B2

(12) United States Patent
Lilie et al.

(10) Patent No.: US 10,288,061 B2
(45) Date of Patent: May 14, 2019

(54) METHOD AND SYSTEM FOR PROTECTION AND DIAGNOSIS OF A LINEAR COMPRESSOR, AND A LINEAR COMPRESSOR

(71) Applicant: Whirlpool S.A., Sao Paulo (BR)

(72) Inventors: Dietmar Erich Bernhard Lilie, Joinville (BR); Mario Henrique Farias Santos, Joinville (BR); Daniel de Figueiredo Maria, Joinville (BR)

(73) Assignee: Whirlpool S.A. (BR)

( * ) Notice: Subject to any disclaimer, the term of this patent is extended or adjusted under 35 U.S.C. 154(b) by 265 days.

(21) Appl. No.: 15/251,106

(22) Filed: Aug. 30, 2016

(65) Prior Publication Data

US 2017/0058885 A1 Mar. 2, 2017

(30) Foreign Application Priority Data

Aug. 31, 2015 (BR) .............................. 102015021009

(51) Int. Cl.

| | |
|---|---|
| *F04B 35/04* | (2006.01) |
| *F04B 35/00* | (2006.01) |
| *F25B 5/02* | (2006.01) |
| *F25B 41/04* | (2006.01) |
| *F04B 49/06* | (2006.01) |

(Continued)

(52) U.S. Cl.
CPC .............. *F04B 49/06* (2013.01); *F04B 35/04* (2013.01); *F04B 35/045* (2013.01); *F04B 49/065* (2013.01); *F04B 49/10* (2013.01); *F04B 49/103* (2013.01); *F04B 51/00* (2013.01); *G05B 23/0275* (2013.01); *F04B 2201/0202* (2013.01); *F04B 2207/043* (2013.01); *F04B 2207/045* (2013.01); *G05B 2219/23211* (2013.01); *G05B 2219/32222* (2013.01)

(58) Field of Classification Search
CPC ........ F25B 11/022; F25B 49/022; F25B 5/02; F04B 49/065; F04B 35/045; F04B 35/04; A61M 1/06; A61M 1/062; A61M 1/064; A61M 1/066
See application file for complete search history.

(56) References Cited

U.S. PATENT DOCUMENTS

| | | |
|---|---|---|
| 6,616,414 B2 | 9/2003 | Yoo et al. |
| 6,812,597 B2 | 11/2004 | McGill et al. |

(Continued)

FOREIGN PATENT DOCUMENTS

WO WO 00/16482 3/2000

OTHER PUBLICATIONS

Suh et al., CAE/CFD Application for Linear Compressor, 9 pages (Year: 2006).*

(Continued)

*Primary Examiner* — Thuy Dao
(74) *Attorney, Agent, or Firm* — Fay Sharpe LLP

(57) ABSTRACT

A method for protection and diagnosis of a linear compression including at least one electronic control. At each work cycle of the linear compressor, the protection method includes detecting a suction time of the linear compressor; detecting a compression time of the linear compressor; and calculating, after detecting a compression time of the linear compressor, a decision parameter equivalent to the difference between the previously detected suction time and the compression time.

14 Claims, 9 Drawing Sheets

(51) Int. Cl.
*F04B 49/10* (2006.01)
*F04B 51/00* (2006.01)
*G05B 23/02* (2006.01)

(56) References Cited

U.S. PATENT DOCUMENTS

| | | | | |
|---|---|---|---|---|
| 8,287,230 B2* | 10/2012 | Hurst, Jr. | ............... | F04B 49/065 |
| | | | | 415/5 |
| 9,121,641 B2* | 9/2015 | Wu | ........................... | F25B 7/00 |
| 9,188,369 B2* | 11/2015 | Kuehl | ................... | F24F 3/1405 |
| 9,335,084 B2* | 5/2016 | Lilie | ...................... | F04B 39/06 |
| 9,366,246 B2* | 6/2016 | Yoo | ......................... | F04B 49/02 |
| 9,605,884 B2* | 3/2017 | Gomes | ...................... | F25B 5/02 |
| 2006/0257264 A1* | 11/2006 | Kim | ..................... | F04B 35/045 |
| | | | | 417/44.1 |
| 2007/0140867 A1* | 6/2007 | Bae | ...................... | F04B 49/065 |
| | | | | 417/44.1 |
| 2008/0314056 A1* | 12/2008 | Thiessen | ............... | F04B 35/045 |
| | | | | 62/228.3 |
| 2011/0135518 A1* | 6/2011 | Kang | ................... | F04B 35/045 |
| | | | | 417/417 |
| 2013/0129540 A1* | 5/2013 | Song | .................... | F04B 35/045 |
| | | | | 417/415 |
| 2013/0255309 A1* | 10/2013 | Wu | ...................... | F24F 3/1405 |
| | | | | 62/510 |

OTHER PUBLICATIONS

Sevekari et al., Modelling and Analysis of Linear Compressor, 7 pages (Year: 2013).*

* cited by examiner

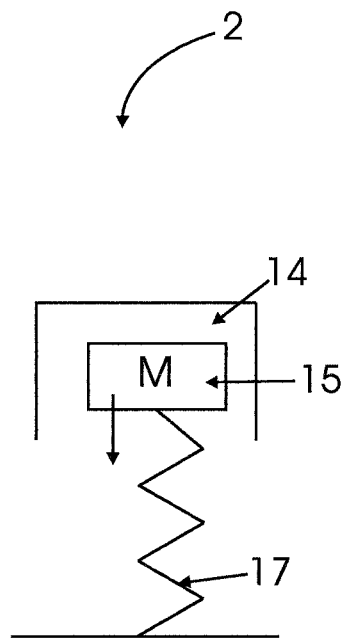 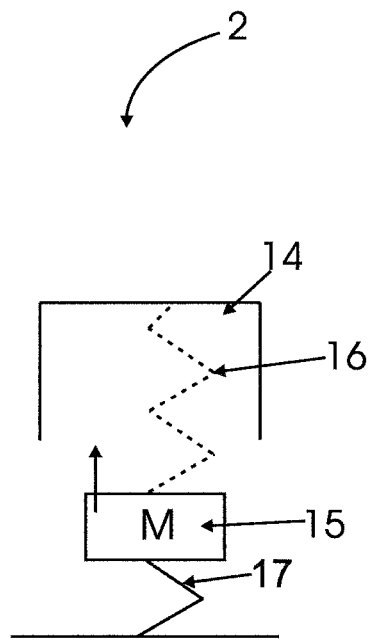
FIG. 1 (a)    FIG. 1 (b)
FIG. 1

METHOD AND SYSTEM FOR PROTECTION AND DIAGNOSIS OF A LINEAR COMPRESSOR, AND A LINEAR COMPRESSOR

CROSS REFERENCE TO RELATED APPLICATION

This application claims priority under 35 USC 119 to Brazilian Patent Application No. BR 102015021009-4 filed Aug. 31, 2015 (Aug. 31, 2015), and the entire disclosure of said Brazilian application is hereby incorporated by reference in its entirety into the present specification.

FIELD OF THE INVENTION

The present invention relates to a method and to a system for protection and diagnosis of a linear compressor. More specifically, it relates to a method and to a system for protection and diagnosis based on the difference between the suction and compression times of a resonant linear compressor.

BACKGROUND

The search for systems and methods that provide efficient protection to linear compressor is constant, so that a few known methods and systems make use of sensors for controlling piston displacement, vibration sensors, or still electric devices that measure, for example, voltage and current values applied to the compressor.

It is advisable that the protection methods make use of the smallest amount of additional component possible, so that a method based on physical parameters of the compressor will become advantageous chiefly in financial terms.

The prior art discloses means for controlling linear compressor, for instance, the international publication WO 00/16482 is based on crossing the voltage by zero for the consequent adjustment of the compressor's operation frequency to as close as possible to its resonance frequency.

Further, document U.S. Pat. No. 6,812,597, in spite of measuring the compressor cycle times, treats such times independently, without using a relative signal, as proposed in the present invention. The analysis of the cycle times in an independent manner is more subject to variations between compressors, entailing a not so reliable control.

Additionally, patent U.S. Pat. No. 6,616,414 uses electric signals and parameters of the motor of the linear compressor to control the piston stroke. Such parameters comprise electric current, voltage applied, resistance, inductance, among other.

Although the above-mentioned methods and systems have advantages in a few aspects, none of them is based on the calculation of the difference between the operation semicycles (advance and recoil) of the compressor. Further, they operate as methods for actuating the compressor, not for diagnosis and protection.

By calculating such difference, one reduces the variations that may take place between different compressors, thus making it possible to apply it to resonant linear compressors that use any cooling gas.

The present invention aims the protection of a method and a system applied to a resonant linear compressor, which propose to detect compressor break, the impact of the piston against the valves plate and undesired resonances of the mechanism, among other aspects.

The method and the system proposed take are based on the measurement of the advance and recoil times of the compressor piston. Preferably, such times are determined from the piston position and, more specifically, from the crossing by zero of the counter electromotive force (CEMF/FCEM) of the electric motor of the linear compressor.

Subtracting the recoil (suction) time from the advance (compression) time, one obtains a determining decision parameter to achieve the objectives of the present invention.

From the determination of this decision parameter, one can detect the incorrect operation of the compressor and prevent future failures, thus operating as a decision and diagnosis parameter of the linear compressor.

OBJECTIVES OF THE INVENTION

The present invention has the objective of providing a method and a system for protection and diagnosis of a resonant linear compressor, which monitor the compression and suction cycles of the compressor.

It is an additional objective of the present invention to provide a method and a system for protection and diagnosis of a resonant linear compressor that turn off the compressor definitively, in case abnormal operation thereof is detected.

It is a third objective of the present invention to provide a method and a system for protection and diagnosis of a resonant linear compressor, which takes as a basis the measurement of the advance (compression) time of the compressor and of the recoil (suction) time of the compressor.

A fourth objective of the present invention is to provide a method and a system for protection and diagnosis of a resonant linear compressor, which are based on a decision parameter calculated from the difference between the total suction time and the total compression time of the linear compressor.

It is a fifth objective of the present invention to provide a method and a system for protection and diagnosis of a resonant linear compressor, which prevent damage to internal components of the compressor by calculating the decision parameter.

An additional objective of the present invention is to provide a method and a system for protection and diagnosis of a resonant linear compressor, which use the decision parameter to diagnose possible failures in the operation of the linear compressor.

BRIEF DESCRIPTION OF THE INVENTION

The present invention describes a method for protection and diagnosis of a linear compressor. The linear compressor comprises at least one electronic control, the protection and diagnosis method is configured so as to comprise the steps of: detecting a suction time of the linear compressor, then detecting a compression time of the linear compressor, and calculating a decision parameter equivalent to the difference between the suction time and the compression time.

Additionally, the present invention describes a compressor, and a protection and diagnosis system that are capable of performing the steps mentioned above.

BRIEF DESCRIPTION OF THE DRAWINGS

The present invention will now be described in greater detail with reference to an example of embodiment represented in the drawings. The figures show:

FIG. 1 is a block illustration of the operation of a linear compressor, wherein FIG. 1(a) represents the suction semicycle, and FIG. 1(b) represents the compression semicycle;

DETAILED DESCRIPTION OF THE INVENTION

Figure 2:
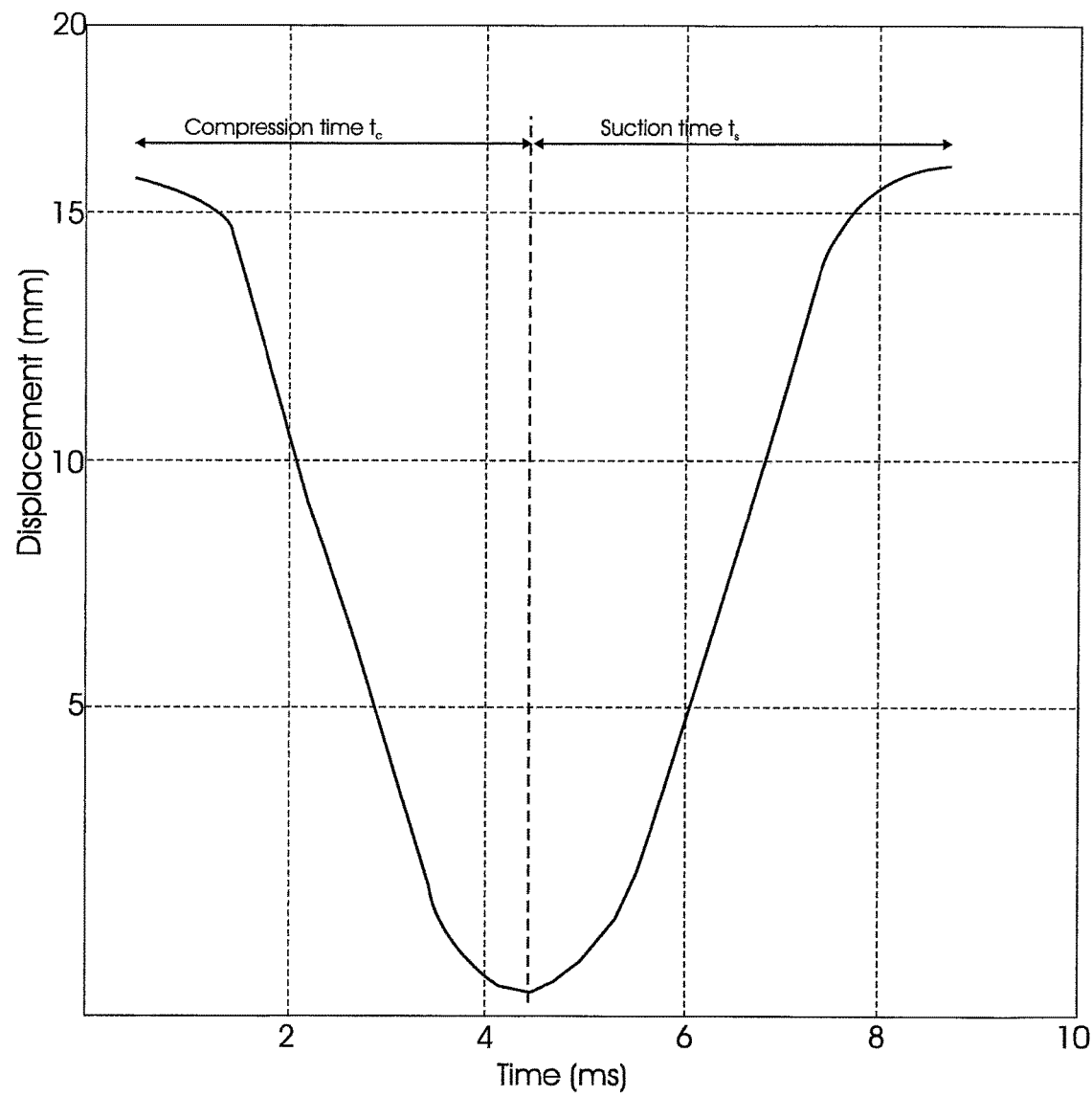
FIG. 2 is a graph of the piston displacement as a function of the time on a resonant linear compressor.

As it is already known, the operation of a linear compressor 2 takes place basically through suction and compression of a cooling gas, thus configuring a suction time (piston recoil) and a compression time (piston advance).

By piston advance one should understand compression of the gas and the consequent discharge thereof. By piston recoil one should understand re-expansion of the gas and suction thereof.

Due to the pressure exerted by the gas during the compression cycle, the respective time to compress it ends up being shorter as compared to the suction time.

FIGS. 1(a) and (b) represent a block illustration of the piston of a linear compressor 2, indicating the displacement thereof during the work semicycles (suction/compression) of the linear compressor 2, enabling one to notice, by simplified viewing of the linear compressor 2, why the compression time is shorter than the suction time.

By work cycles of the compressor, or compression and suction times, one should understand the advance semicycle of the compressor (compression), comprising the compression and the discharge of the cooling gas.

In the same way, for the recoil semicycle of the compressor (suction), re-expansion and suction of the cooling gas take place.

With reference to FIG. 1(a), it represents the operation of the compressor in its suction semicycle. One observes that a piston 15 is arranged at the upper portion of the chamber 14, and by means of the displacement of the spring 17, the piston displaces as far as the lower portion of the chamber 14, thus initiating the compression cycle, as indicated in FIG. 1(b).

In FIG. 1(b), it is possible to observe that in the compression semicycle of the linear compressor 2 the displacement of the piston 15 undergoes resistance of the pressure exerted by the cooling gas, the latter acting as a spring, indicated in FIG. 1(b) with reference 16. In this way, the compression time becomes shorter than the suction time.

In an embodiment, the calculation of the suction time $t_s$ of the compressor 2 indicated in FIG. 1(a) can be obtained from the expression (1), as follows:

$$t_s = \pi \sqrt{\frac{M}{K}}, \qquad \text{expression (1),}$$

wherein M is equivalent to the piston 15 mass and K refers to the constant of the spring 17 shown in FIGS. 1(a) and (b).

In a similar way, an embodiment for obtaining the compression time $t_c$ of the compressor 2 illustrated in FIG. 1(b) is represented by the expression (2) below:

$$t_c = \pi \sqrt{\frac{M}{K+K_g}}, \qquad \text{expression (2),}$$

wherein $K_g$ is equivalent to the force exerted by the gas, opposite the piston displacement, as illustrated in FIG. 1(b), indicated by reference number 16.

In a preferred embodiment, considering the constant K of the spring to be 95000 N/m, the piston mass to be M=0.18 kg, one would have suction time $t_s$=4324.4 µs. Admitting the constant $K_g$ as 5000 N/m, one would have the compression time shorter than $t_s$, $t_c$ being=4214.9 µs.

FIG. 2 illustrated a graph of the displacement of the piston 15, in millimeters, as a function of the time, in milliseconds of a linear compressor. In this graph one observes more clearly the compression time $t_c$ and suction time $t_s$ mentioned before.

The present invention proposes a method and a system for protection and diagnosis of a linear compressor 2 based on the compression time $t_c$ and suction time $t_s$ to detect possible abnormalities in the operation of the compressor and in its components, thus enabling, if desired, definitive interruption of the compressor operation, in case an abnormality is detected.

For this purpose, the method and the system proposed make use of a decision parameter $\Delta T$, which parameter is preferably determined from the expression 3 below:

$$\Delta T = t_s - t_c, \qquad \text{expression 3}$$

According to the above expression, the parameter $\Delta T$ depends only on the suction time $t_s$ and compression time $t_c$.

Figure 3:
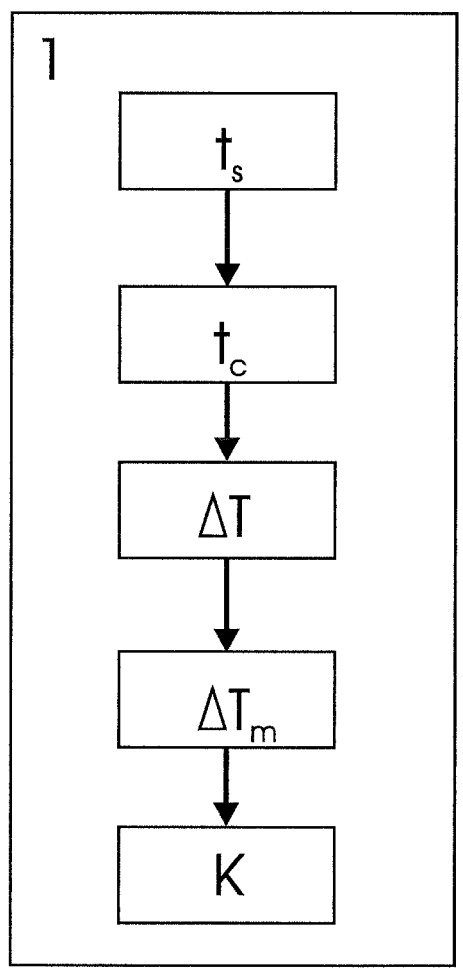
FIG. 3 is a block representation of the method for protection and diagnosis of a linear compressor as proposed in the present invention.

FIG. 3 is a block-representation of the protection and diagnosis method 1 of the linear compressor 2, as proposed in the present invention. For a better understanding of the invention, said protection and diagnosis method 1 will be referred to hereinafter only as method 1.

The method 1 in question comprises a first step of detecting a suction time $t_s$ of the linear compressor, then said method 1 comprises the step of detecting a compression time $t_c$ of the linear compressor.

Continuing the description, the method 1 proposed in the present invention comprises the step of calculating the decision parameter $\Delta T$.

As already mentioned, the decision parameter $\Delta T$ is calculated from the difference between the suction time $t_s$ and the compression time $t_c$, as indicated by the expression:

$$\Delta T = t_s - t_c,$$

As already mentioned, such a parameter $\Delta T$ is preferably determined by means of the signal of the CEMF (Counter Electromotive Force (FCEM)) from the electric motor of the linear compressor, more precisely from the crossing of the FCEM by zero.

The obtainment of the decision parameter $\Delta T$ by means of the FCEM/CEMF is only a preferred feature of the present invention, so that, alternatively, the suction time $t_s$ and the compression test $t_c$ can be obtained in other ways.

Only by way of example, the times $t_c$ and $t_s$ might be obtained by using a stroke sensor for the piston, as well as by any method to estimate the position, velocity or acceleration thereof. Estimating devices via electric parameters of the motor also enable one to achieve said times.

The method 1 proposed further comprises the step of storing said decision parameter $\Delta T$ in an internal memory 10 of an electronic control of the linear compressor 2. Said step should be carried out simultaneously in the step of calculating the decision parameter $\Delta T$ previously informed.

It is important to point out that the steps mentioned above should be carried out at each work cycle of the linear compressor. Thus, in the course of the operation of the compressor 2, new values of the decision parameter $\Delta T$ will be stored in the memory 10 of the electronic control 11. The previously stored values should be kept.

Thus, and further with reference to FIG. 3, it becomes possible to calculate an average decision parameter $\Delta T_m$ of the linear compressor. The average parameter $\Delta T_m$ should be calculated from the values of $\Delta T$ previously stored in the memory 10 of the electronic control 11.

In this way, at each work cycle of the linear compressor 2 a new value of the decision parameter $\Delta T$ will be stored and a new average decision parameter $\Delta T_m$ will be established.

The method for protection and diagnosis of a linear compressor 1 as proposed in the present invention takes as a basis the values of $\Delta T$ and $\Delta T_m$ to detect abnormalities in the functioning of the compressor 2, and, as a result, interrupt the functioning thereof.

More specifically with respect to the decision parameter $\Delta T$, if the latter is inserted in a previously defined area of operation of the linear compressor, this fact will indicate that the compressor is in normal operation conditions.

Obtainment of the decision parameter $\Delta T$ out of the limits of the operation area will indicate possible abnormality in the compressor operation.

For example, considering that the operation area is delimited by a normality range and by a maximum operation limit B, the obtainment of a decision parameter $\Delta T$ lower than the normality range may indicate the occurrence of anomalies in the pumping of the cooling gas.

In a similar way, the obtainment of a decision parameter $\Delta T$ higher than the maximum operation limit B may represent piston collision against the valve plate of the linear compressor 2.

Figure 5:
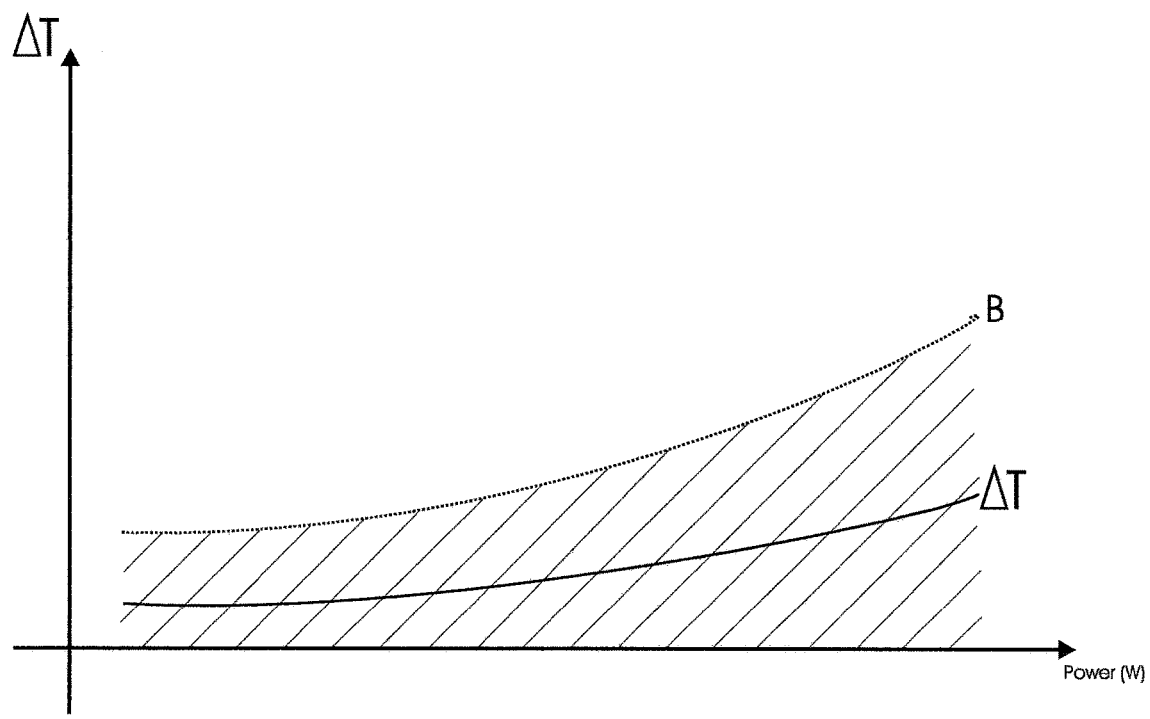
FIG. 5 is a graph representation of the decision parameter ($\Delta T$) in normal operation of a linear compressor.

FIG. 5 represents a graph of the decision parameter $\Delta T$ as a function of the power applied to the linear compressor; in this graph the operation area, the normality range and the maximum operation limit B may be viewed.

The normality range is referred to as the lower limit of the operation area and represents values for the decision parameter equal to zero. Thus, the obtainment of any lower $\Delta T$ value is an indication of abnormality in the functioning of the linear compressor 2.

On the other hand, the maximum operation limit is referred by the curve B in the graph shown in FIG. 5 and represents the maximum limit of the regular operation area of the linear compressor. Thus, any $\Delta T$ value higher than the maximum limit of operation B represents an indication of abnormality in the functioning of the linear compressor 2.

In harmony with the foregoing, the regular operation area of the linear compressor is indicated in the graph in question by the hachured region arranged between the maximum limit of operation B and the normality range ($\Delta T=0$). Thus, any value obtained for the decision parameter $\Delta T$ that is within the hachured area indicates the operation of the compressor in its normal and acceptable behavior, as referenced by the full line shown in FIG. 5 and referencing the decision parameter $\Delta T$.

In a graph of the decision parameter $\Delta T$ as a function of the power applied to the compressor, the maximum operation limit B may be obtained from the operation of the compressor 2 in all its conditions of use, thus establishing the maximum acceptable relationship for the compression and suction times and the maximum operation limits for the compressor.

For example, if the compressor 2 is used in a cooling equipment, the curve B is obtained from the operation of the compressor 2 in preferred conditions of maximum condensation, maximum and minimum evaporation, among others.

More specifically, the curve referring to the maximum operation limit B is obtained from the technical characteristics that embrace the compressor operating "envelope".

Thus, the decision parameter may be used as a means of diagnosis of the operation of a linear compressor and the prediction of failures. In a preferred embodiment, one can detect the collision of the piston of the linear compressor 2 against the valve plate, which would entail an increase in the value of the decision parameter $\Delta T$.

Figure 6:
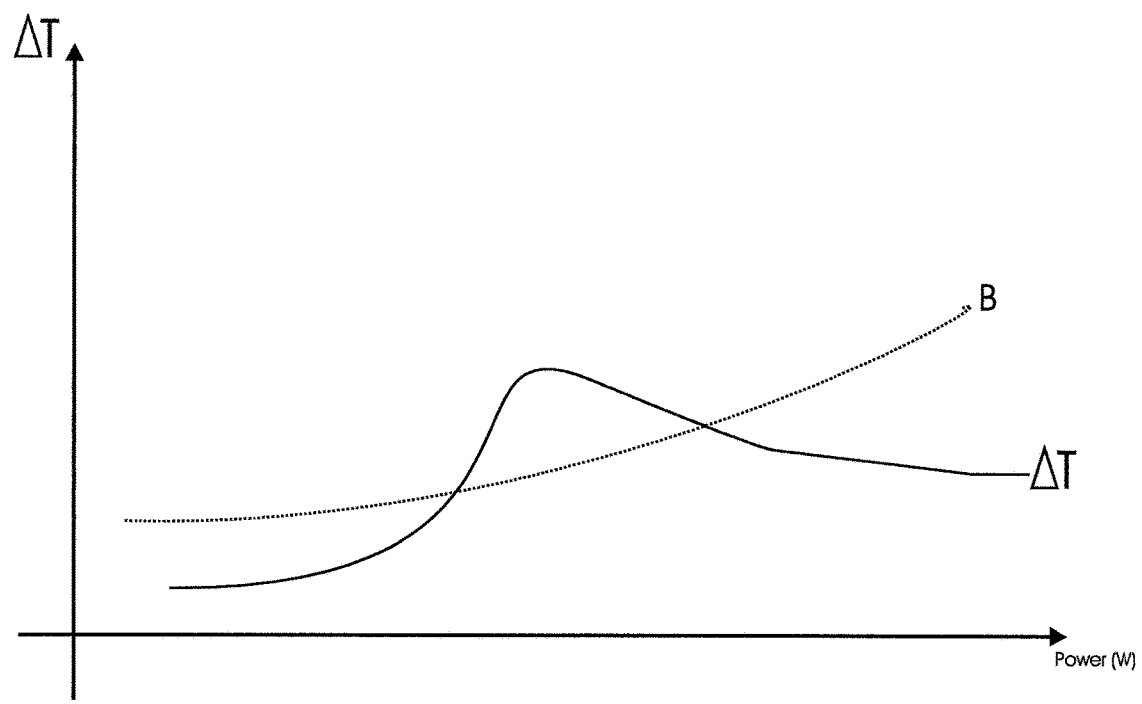
FIG. 6 is a graph representation of the decision parameter ($\Delta T$) in abnormal operation of the linear compressor.
Figure 7:
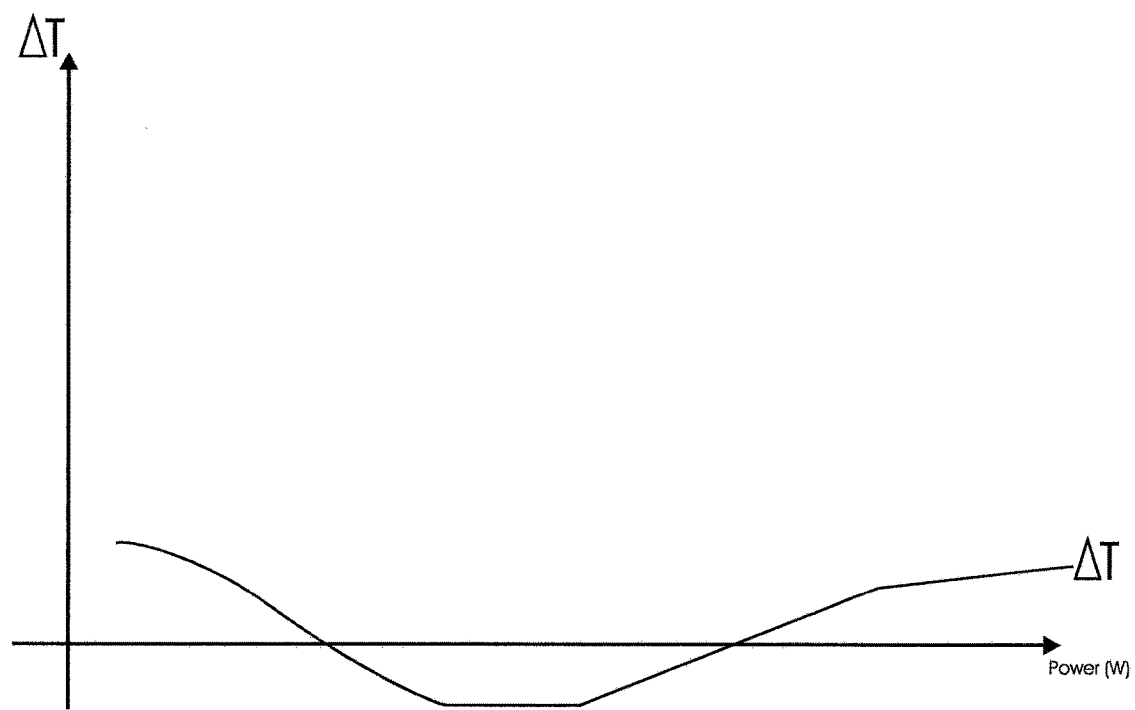
FIG. 7 is an additional graph representation of the decision parameter ($\Delta T$) in abnormal operation of a linear compressor.

With such addition, $\Delta T$ would exceed the region delimited by the maximum limit of operation B, as indicated in FIG. 6 of the present application. The opposite situation, in which $\Delta T$ assumes values lower than the one delimited by the normality range ($\Delta T=0$), is indicated in FIG. 7.

Similarly, one indication of abnormalities in the operation of the linear compressor 2 will occur when the average decision parameter $\Delta T_m$ is higher than a maximum limit of normality.

If the average decision parameter $\Delta T_m$ is higher than the maximum limit of normality by a determined number of work cycles n of the compressor 2, the protection and diagnosis method is preferably configured so as to turn off the resonant linear compressor 2 definitively.

If the average decision parameter $\Delta T_m$ is lower than the maximum limit of normality, the proposed method 1 is configured so as to go on with the electric feed of the linear compressor 2, since in this scenario there are no indications of abnormalities in the functioning of the compressor 2.

Additionally, as already mentioned, from the calculation of the decision parameter $\Delta T$ by means of the difference between the suction time $t_s$ and compression time $t_c$, one can compare the parameter $\Delta T$ with a normality range configured previously in the internal memory 10 of the electronic control 11.

Thus, one should compare the $\Delta T$ value with the normality range and, if $\Delta T$ is lower than said normality range or higher than the maximum operation limit B, by a determined number of work cycles n of the compressor 2, the power feed of the compressor 2 may be interrupted.

Further, from the determination of the decision parameter $\Delta T$ and of its average value $\Delta T_m$, one observes in FIG. 3 that the proposed method 1 is capable of detecting problems in the functioning of the compressor 2 by means of a variability indicator K.

For example, from the variability indicator K one can preferably interrupt the operation of the compressor when it is detected that the latter is operating at undesired resonance frequencies, which may entail excessive vibrations and, as a result, damage the product.

For this purpose, the variability indicator K should be preferably calculated at each work cycle of the linear compressor 2, from the expression 4 below:

$$K = \Delta T_m - \Delta_p \qquad \text{expression 4}$$

If the absolute value (module value) of the variability indicator K is higher than a resonance pattern, this fact will indicate compressor operation at undesired resonance frequencies.

Thus, if this takes place, the method 1 proposed herein is preferably configured so as to interrupt the power feed of the compressor 2. If no K value exceeds the resonance pattern A, the compressor 2 will continue operating normally.

Figure 8:
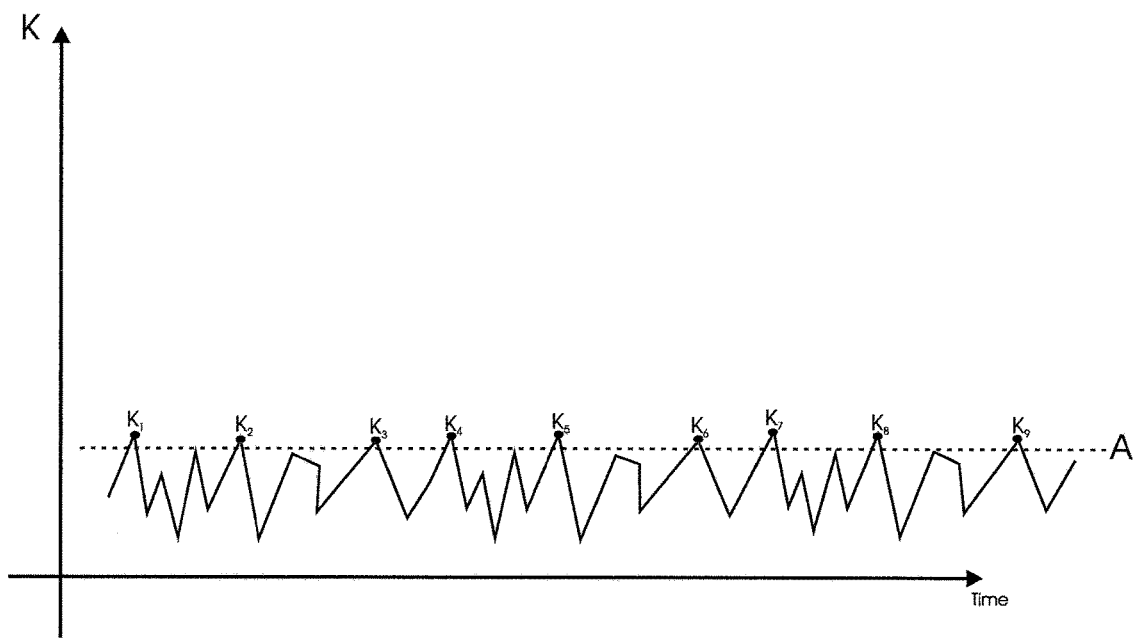
FIG. 8 is a graph representation of the variability of the decision parameter in abnormal operation of a linear compressor.

FIG. 8 is a preferred representation for the behavior of the variability indicator K as a function of the time. In this figure the resonance pattern is indicated by the dashed line A. One observes that the variability indicator K assumes values ($K_1$, $K_2$, $K_3$, $K_4$, $K_5$, $K_6$, $K_7$, $K_8$ e $K_9$) higher than the resonance pattern A, which may indicate compressor operation at undesired resonance frequencies.

Thus, from the decision parameter $\Delta T$ and of its comparison with the average decision parameter $\Delta T_m$ (variability indicator K), one can diagnose and prevent operation of the compressor 2 at undesired frequencies. For example, if the variability indicator K is higher than the displacement pattern, the power feed of the compressor 2 may be interrupted. As mentioned before, the curve represented for the variability indicator K is only a preferred representation for such a parameter.

One should mention that the formula set forth for obtaining the variability indicator K is only a preferred one, so that any other formula for dispersion calculation might be used, as for example, standard deviation.

Additionally, the variability indicator K is useful in diagnosing failures that lead the compressor to an unpredictable behavior, for instance, a different behavior for each operation cycle. On the other hand, the decision parameter $\Delta T$ is useful in diagnosing failures that lead the compressor to an unwanted, but regular behavior at each work cycle (such as the piston collision against the valve plate).

Figure 9:
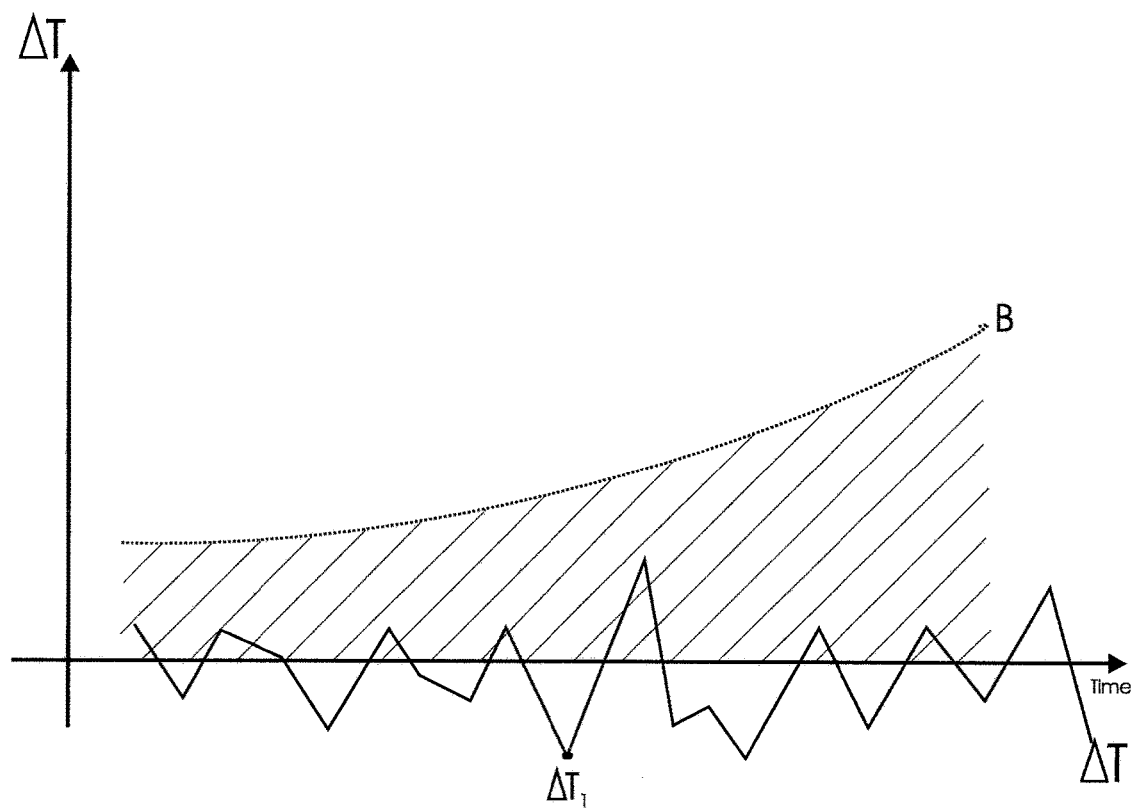
FIG. 9 is an additional graph representation of the decision parameter ($\Delta T$) in abnormal operation of a linear compressor.

Further, a typical representation of the behavior of the decision parameter $\Delta T$ in a condition of failure of the linear compressor 2 is given in FIG. 9, which shows a graph of the decision parameter $\Delta T$ as a function of the time.

As can be seen, the behavior of the decision parameter $\Delta T$ reveals a high variability and still negative values, as for instance $\Delta T_1$.

If one opts for the sequence of the power feed of the linear compressor 2 from the parameters $\Delta T$, $\Delta T_m$ and K, the proposed method 1 is configured so as to carry out again the step of detecting a suction time $t_s$ of the linear compressor 2, thus restarting the previously mentioned steps.

Further with regard to the decision parameter $\Delta T$, the later depends on the compressor operation conditions, such as room temperature, temperature of the cooler and freezer, operation power, and also on mechanical parameters like piston mass, kit mass, piston diameter and spring rigidity. In this way, each compressor 2 will have a behavior for the specific decision parameter $\Delta T$, even if the power applied on each compressor 2 is the same.

The variations in power will affect the $\Delta T$ value directly, and the higher the power the higher the value of the decision parameter $\Delta T$.

Variations in piston mass (wear) will also affect the $\Delta T$. One may establish that a 10% variation in the piston mass will cause $\Delta T$ to vary by 0.4%. Similarly, 10% variation in the kit mass will affect $\Delta T$ by 0.6%.

Variations in the spring rigidity are the factor that affects $\Delta T$ the most, such variation being also related to the variation in the power applied to the compressor. Tests carried out showed that 10% variation in the spring rigidity will affect $\Delta T$ by 13%.

Further, it is valid to mention that carrying out the method proposed herein should not be limited initially to carrying out the step of detecting the suction time $t_s$ and then the compression time $t_c$ of the linear compressor. One may first detect the compression time $t_c$ and then detect the suction time $t_s$.

In a similar way, the decision parameter $\Delta T$ may be calculated by subtraction between the compression time $t_c$ and the suction time $t_s$, in this case the value obtained would be negative and the due adaptations should be made in the proposed method, and the consequent verification of the acceptance of the $\Delta T$ value obtained (as well as of the indicator K and of $\Delta T_m$).

Figure 4:
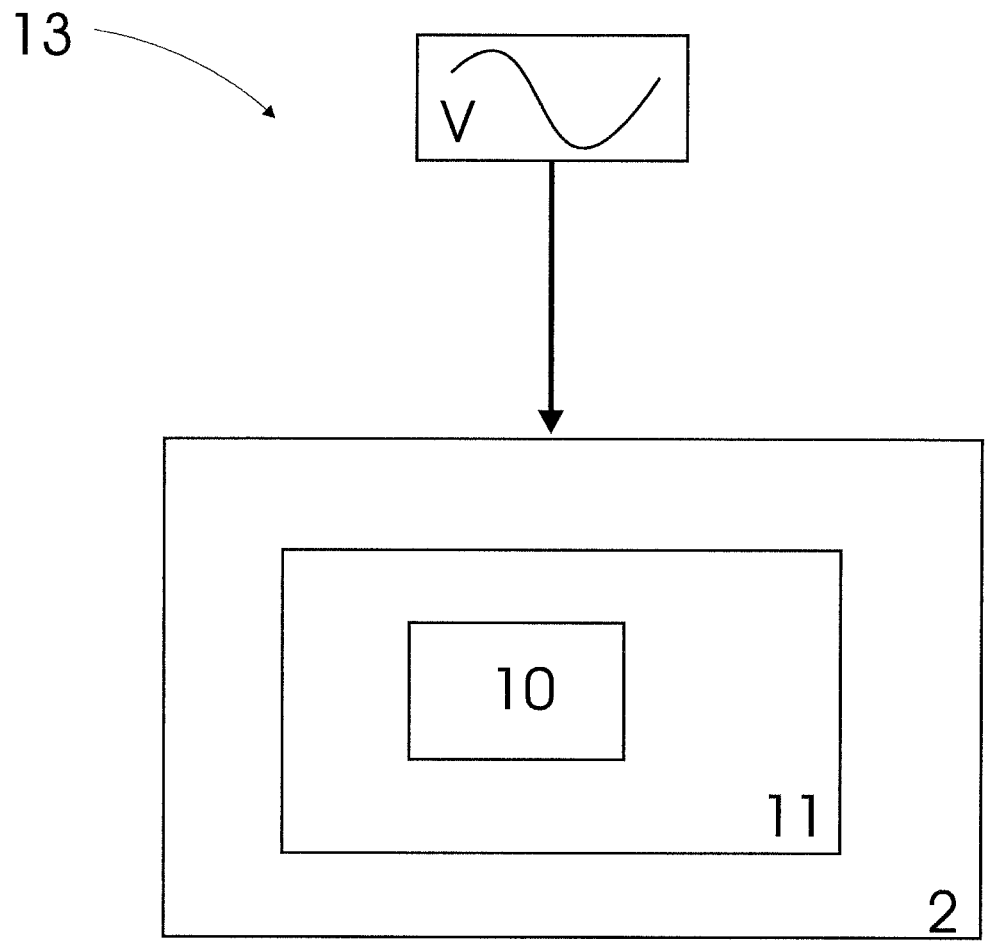
FIG. 4 is a block representation of the system for protection and diagnosis of a linear compressor as proposed in the present invention.

The present invention further relates to a system 13 for protection of a linear compressor 2, capable of carrying out the steps of the method described above, FIG. 4 is a block representation of the proposed system 13.

For this purpose, said compressor 2 should comprise at least one internal memory 10 for storing the decision parameter $\Delta T$ at each work cycle of the linear compressor. As already mentioned, the decision parameter $\Delta T$ is calculated from the difference between the suction time $t_s$ and the compression time $t_c$ of the compressor 2.

Further, the proposed system 13 is preferably configured so as to interrupt the electric association between a feed source V and the linear compressor 2, if the decision parameter $\Delta T$ is lower than a maximum operation limit B by a determined number of work cycles "n" of the linear compressor 2.

Further, said protection system 13 is capable of determining an average decision parameter $\Delta T_m$ at each work cycle of the linear compressor and preferably interrupt the electric association between the compressor 2 and the feed source V, if said average decision parameter $\Delta T_m$ is higher than a maximum limit of normality by a determined number of work cycles "n" of the compressor 2.

Additionally, the system 13 is configured so as to detect a variability indicator K through the expression 4 shown before. As already mentioned, through the variability indicator K one can determine operation of the compressor 2 at undesired resonance frequencies and, as a result, interrupt the power feed, if desired.

Finally, the present invention further relates to a linear compressor 2 of a piece of cooling equipment, said linear compressor 2 being electrically associable to a feed source V and comprising at least one internal memory 10 and an electronic control 11.

The proposed linear compressor 2 is configured so as to determine the decision parameter $\Delta T$ from the difference between a suction time $t_s$ and a compression time $t_c$ of the compressor 2. Further, the electronic control 11 is configured so as to preferably interrupt the electric association between the compressor 2 and the feed source V, if the decision parameter $\Delta T$ is lower than the normality range or higher than a maximum operation limit B.

Further, the linear compressor 2 is configured so as to determine the average decision parameter $\Delta T_m$, so that, if $\Delta T_m$ is higher than the maximum limit of normality, the electronic control 11 will interrupt the electric feed of the compressor 2.

In harmony with the method 1 and the system 13 described, the compressor 2 is configured so as to determine a variability indicator K and, comparing the indicator K with a resonance pattern, one can detect operation of the compressor 2 at undesired resonance frequencies.

With regard to the maximum limit of normality and to the maximum operation limit B, they are previously stored in the internal memory 10 of the linear compressor 2 from the average values of $\Delta T_m$ considered to be accepted.

In a similar way, the normality range is previously established in the internal memory 11 from $\Delta T$ values considered acceptable. In the graphs shown in FIGS. 5, 6, and 7, the normality range is indicated as being equal to zero ($\Delta T=0$).

Similarly, acceptable values for the variability indicator K are previously established in the internal memory 11 of the linear compressor 2, since the latter depends on $\Delta T$ and $\Delta T_m$.

The proposed method and system for protection and diagnosis, from the calculation of the decision parameter $\Delta T$, enable previous detection of damage to components of the linear compressor 2, as well as enable easy viewing of abnormal operation of the compressor.

Further, from the calculation of the decision parameter $\Delta T$, one can protect the compressor against very intense impacts against the valve plate, as well as identify the limit of the compressor piston stroke. In this way, one may use the decision parameter $\Delta T$ in techniques of controlling the piston stroke of the linear compressor 2, as well as a means (parameter) for monitoring its operation.

Additionally, said method and system can be applied on resonant linear compressors that make use of any cooling gas, since they are based only on the monitoring of compression and suction cycles of the compressor.

Further, one should not necessarily interrupt the power feed of the compressor, if the value obtained for the decision parameter $\Delta T$, average decision parameter $\Delta T_m$ and variability indicator K are out of the acceptable limits.

In an alternative embodiment, the achievement of a decision parameter $\Delta T$ higher than the maximum operation limit be may be used as information (diagnosis) for automatically deducing the application power of the compressor, thus reducing the $\Delta T$ value achieved and causing the compressor to operate normally.

A preferred example of embodiment having been described, one should understand that the scope of the present invention embraces other possible variations, being limited only by the contents of the accompanying claims, which include the possible equivalent.

The invention claimed is:

1. A method for protection and diagnosis of a linear compressor, the linear compressor comprising at least one electronic control, the protection and diagnosis method comprising, at each work cycle of the linear compressor, the steps of:
  detecting a suction time of the linear compressor;
  detecting a compression time of the linear compressor;
  subsequently, calculating a decision parameter equivalent to the difference between the suction time and the compression time;
  concomitantly with the step of calculating the decision parameter, storing the calculated value of the decision parameter in an internal memory of the electronic control;
  after the step of storing the calculated value of the decision parameter, calculating an average decision parameter;
  wherein, after the step of calculating the average decision parameter, the electric feed of the linear compressor is interrupted if the value of the average decision parameter is higher than a maximum limit of normality by a determined number of work cycles of the linear compressor.

2. A method for protection and diagnosis of a linear compressor, the linear compressor comprising at least one electronic control, the protection and diagnosis method comprising, at each work cycle of the linear compressor, the steps of:
  detecting a suction time of the linear compressor;
  detecting a compression time of the linear compressor;
  subsequently, calculating a decision parameter equivalent to the difference between the suction time and the compression time;
  concomitantly with the step of calculating the decision parameter, storing the calculated value of the decision parameter in an internal memory of the electronic control;
  after the step of storing the calculated value of the decision parameter, calculating an average decision parameter;
  wherein, after the step of calculating the average decision parameter, the electric feed of the linear compressor continues, if the average decision parameter is lower than a maximum limit of normality.

3. A method for protection and diagnosis of a linear compressor, the linear compressor comprising at least one electronic control, the protection and diagnosis method comprising, at each work cycle of the linear compressor, the steps of:
  detecting a suction time of the linear compressor;
  detecting a compression time of the linear compressor;
  subsequently, calculating a decision parameter equivalent to the difference between the suction time and the compression time;
  concomitantly with the step of calculating the decision parameter, storing the calculated value of the decision parameter in an internal memory of the electronic control;
  after the step of storing the calculated value of the decision parameter, calculating an average decision parameter;
  said method further comprising calculating a variability indicator of the linear compressor at each work cycle of the linear compressor, the variability indicator being related to the average decision parameter and to the decision parameter.

4. The method for protection and diagnosis of a linear compressor according to claim 3, further comprising interrupting the electric feed of the linear compressor if the absolute value of the variability indicator is higher than a resonance pattern.

5. The method for protection and diagnosis of a linear compressor according to claim 3, further comprising continuing the electric feed of the linear compressor if the absolute value of the variability indicator is lower than the resonance pattern.

6. The method for protection and diagnosis of a linear compressor according to claim 5, wherein, after the step of calculating the decision parameter, the decision parameter is compared with a normality range and with a maximum operation limit, previously established.

7. The method for protection and diagnosis of a linear compressor according to claim 6, wherein, after the step of comparing the decision parameter with the normality range and with the maximum operation limit, the electric feed of the linear compressor is interrupted if the decision parameter is lower than the normality range or higher than the maximum operation limit.

8. The method for protection and diagnosis of a linear compressor according to claim 6, wherein, after the step of comparing the decision parameter with the normality range and with the maximum operation limit, the electric feed of the linear compressor is continued if the decision parameter is higher than the normality range and lower than the maximum operation limit.

9. The method for protection and diagnosis of a linear compressor according to claim 6, wherein the normality range is equivalent to values for the decision parameter equal to zero.

10. The method for protection and diagnosis of a linear compressor according to claim 9, further comprising the step of interrupting the electric feed of the linear compressor if the decision parameter is lower than zero.

11. The method for protection and diagnosis of a linear compressor according to claim 6, further comprising the step of establishing the maximum operation limit of the linear compressor from the operation of the linear compressor in maximum operation conditions.

12. The method for protection and diagnosis of a linear compressor according to claim 6, further comprising the steps of:
reducing the power applied to the linear compressor if the value obtained for the decision parameter is higher than the maximum operation limit, alternatively,
increasing the power applied to the linear compressor if the value obtained for the decision parameter is lower than the normality range.

13. A system for protection and diagnosis of a linear compressor, the linear compressor electrically associable to a feed source and comprising at least:
an electronic control provided with at least one internal memory, the internal memory being capable of storing a decision parameter of the linear compressor at each work cycle of the linear compressor, so that:
the protection and diagnosis system determines the decision parameter from the difference between a suction time and a compression time of the linear compressor; and
the system interrupts the electric association to the feed source and the linear compressor if the decision parameter is lower than a normality range or higher than a maximum operation limit;
wherein the electronic control is configured to determine an average decision parameter at each work cycle of the linear compressor and is further configured to determine a variability indicator of the linear compressor, the variability indicator being related to the decision parameter and to the average decision parameter;
wherein the electric feed between the linear compressor and the feed source continues if the absolute value of the variability indicator is lower than the displacement pattern.

14. The system according to claim 13, wherein the system is configured to interrupt the electric association between the linear compressor and the feed source if the absolute value of the variability indicator is higher than a previously established resonance pattern.

* * * * *